United States Patent [19]

Humber

[11] Patent Number: 5,305,785

[45] Date of Patent: Apr. 26, 1994

[54] WASHING MACHINE OR ICE MAKER OUTLET BOX INSTALLATION WITH TORQUE INHIBITING WATER SUPPLY CONNECTION

[75] Inventor: Jeffery A. Humber, Memphis, Tenn.

[73] Assignee: IPS Corporation, Collierville, Tenn.

[21] Appl. No.: 84,852

[22] Filed: Jun. 28, 1993

[51] Int. Cl.⁵ .............................................. F16L 5/00
[52] U.S. Cl. .................................. 137/360; 251/148; 251/368; 285/382.7
[58] Field of Search .................... 137/360; 285/382.7; 251/368, 148, 152

[56] References Cited

U.S. PATENT DOCUMENTS

| 2,127,611 | 8/1938 | Mueller | 285/382.7 X |
| 2,344,698 | 3/1944 | Howe | 285/382.7 X |
| 4,564,249 | 1/1986 | Logsdon | 137/360 |
| 4,848,802 | 7/1989 | Wolf et al. | 285/382.7 X |
| 5,050,632 | 9/1991 | Means, Jr. | 137/360 |
| 5,169,122 | 12/1992 | Sunderland | 137/360 X |

Primary Examiner—Martin P. Schwadron
Assistant Examiner—Kevin L. Lee
Attorney, Agent, or Firm—Baker, Maxham, Jester & Meador

[57] ABSTRACT

A plumbing installation is provided which includes an outlet box, at least one water supply pipe extending into the box and a torque inhibiting connection between the pipe and a boiler drain valve positioned in the interior of the box. A compression nut is screwed over a male threaded lower shank of the boiler drain valve to compress a ferrule around the upper end of the water supply pipe. A male threaded cylindrical adapter is connected to, and extends downwardly from, the compression nut through a water supply hole in a bottom wall of the outlet box. The adapter surrounds the water supply pipe. A lock nut is screwed over the adapter and squeezes the bottom wall between the compression nut and the lock nut. When the water supply pipe is made of CPVC this installation prevents lateral movement and/or torquing of the pipe which could weaken or fracture chemical welds between a lower end of the CPVC pipe and a CPVC fitting.

11 Claims, 1 Drawing Sheet

WASHING MACHINE OR ICE MAKER OUTLET BOX INSTALLATION WITH TORQUE INHIBITING WATER SUPPLY CONNECTION

BACKGROUND OF THE INVENTION

The present invention relates to plumbing installations, and more particularly, to the installation of a wall mounted box for enclosing one or more valves which are rigidly mounted to a bottom wall of the box and connected to a CPVC water supply pipe in a manner that inhibits the transmission of torque to the CPVC pipe and its adhesively attached CPCV fitting, the torque resulting from manually turning a handwheel of the valve ON or OFF.

Local governing bodies typically mandate building codes, such as the Uniform Plumbing Code ("UPC"), that incorporate very specific regulations regarding plumbing installations. Such regulations usually specify in detail the installation necessary for enabling the proper connection of a washing machine to the hot and cold water lines and the waste system of a building. One widely used installation for this purpose utilizes a so-called washing machine outlet box. Such a box is typically molded from plastic and is installed in drywall so that it opens outwardly. Sometimes washing machine outlet boxes are made of sheet metal. A vertical drain/waste/vent ("DWV") pipe is coupled to a drain inlet opening in the center of a horizontal bottom wall of the box. The hook-shaped end of the outlet hose of the washing machine is inserted in the drain inlet opening. Hot and cold water supply pipes extend vertically through water supply holes in the bottom wall of the box on either side of the drain inlet opening. These water supply holes typically have a diameter that is substantially larger than the diameter of the water supply pipes so that the pipes are loosely mounted and are free to move laterally. Sometimes elastomeric grommets are seated in the water supply holes in the bottom wall and surround the water supply pipes. Typically a boiler drain valve with a compression type fitting is connected to the upper end of each water supply pipe. Female fittings on the ends of the hot and cold water hoses from the washing machine are screwed over the corresponding male fittings of the valves. The boiler drain valves for the hot and cold water supply can be independently turned ON and OFF by manually rotating valve handwheels.

The boiler drain valves utilized with a conventional washing machine outlet box are typically made of Brass so that they will resist corrosion. Where Copper water pipe is utilized, the end of each pipe extends through a ferrule which is seated inside a male threaded lower shank of the boiler drain valve. A compression nut is screwed tightly over the lower shank to compress the ferrule around the Copper pipe and insure a leak-proof connection. There is no need to secure the boiler drain valves directly to the bottom wall of the outlet box. This is because the Copper pipe is soldered to fittings which can withstand the torque resulting from turning the valves ON and OFF by manual rotation of the handwheels of the valves.

Recently CPVC plastic pipe has been widely utilized in residential construction. The upper ends of CPVC pipe are usually connected to standard boiler drain valves housed in a washing machine outlet box in the same manner as that described above in connection with Copper water pipe. However, in such an installation the lateral force and/or torque on the CPVC pipe which results from rotating the handwheel of a valve can weaken, damage or even break the solvent welded connection between the lower end of the CPVC pipe and a ninety degree angle CPVC fitting. This can in turn lead to water leaks behind the drywall that can result in substantial damage to the building structure. The installation of grommets that fit into the water supply holes in the bottom wall and surround the CPVC water supply pipes does not inhibit the transmission of torque to the pipes, which can damage solvent welded connections to the pipes.

In the past there have been attempts to overcome the foregoing problem of laterally moving and/or torquing of CPVC pipes connected to boiler drain valves in a washing machine outlet box. One approach has utilized a specially fabricated boiler drain valve with an extended male shank with male threads. The male shank can be inserted through the corresponding water supply hole in the bottom wall of the washing machine outlet box and secured thereto with a nut. This is a relatively expensive approach that requires a custom boiler drain valve not readily available to plumbers. Plumbers have screwed a transition fitting over the male shank of the valve in order to connect the CPVC water supply pipe to the valve. However, the transition fitting utilized has female tapered threads and was not intended to be screwed over the straight threads of the male threaded shank of the valve, which is designed for connecting Copper pipe. Therefore the joint between the transition fitting and the specially fabricated boiler drain valve frequently leaks.

Another approach to overcoming the CPVC torquing problem has utilized a standard boiler drain valve whose lower shank is screwed into a female adapter. The female adapter has an extended shank with male threads which can be inserted through the corresponding water supply hole in the bottom wall of the washing machine outlet box and secured thereto with a nut. This approach requires that a sealant be used to insure that the joint between the boiler drain valve and the female adapter is leak-proof. The sealant may be pipe joint compound or TEFLON (Trademark) sealing tape. In either case the application of the sealant adds time and cost to the installation. Furthermore, the female adapter has a lower male shank with straight threads. Once again plumbers have screwed a transition fitting over the male shank of the adapter in order to connect the CPVC water supply pipe to the adapter. However, the transition fitting utilized has female tapered threads and was not intended to be screwed over the straight threads of the male threaded shank of the adapter, which is designed for connecting Copper pipe. Therefore the joint between the transition fitting and the female adapter frequently leaks.

It is also conventional to utilize a molded plastic outlet box to mount a water supply valve in a recessed manner in a kitchen wall for connecting a water supply line to an ice maker of a refrigerator. The typical ice maker outlet box is smaller than the typical washing machine outlet box. The ice maker box encloses only one valve and has no drain. One type of valve frequently utilized in an ice maker outlet box is similar to a boiler drain valve except that instead of a male fitting for connecting a washing machine outlet hose, the valve has a compression type fitting for connecting one-quarter inch Copper or plastic tubing from the ice maker.

Presently it is common practice for plumbers to install one-half inch CPVC pipe so that it extends loosely through a hole in the bottom wall of the ice maker outlet box much in the same way that CPVC pipe is conventionally connected to boiler drain valves in a washing machine outlet box. The CPVC water supply pipe is connected to the male threaded lower shank of the valve in the ice maker outlet box, but the valve is not anchored to the bottom wall of the ice maker outlet box. When the handwheel of the valve is turned, the CPVC pipe is torqued, which can weaken or damage its adhesive connection with a CVPC fitting.

SUMMARY OF THE INVENTION

It is therefore the primary object of the present invention to provide an outlet box installation with a torque inhibiting connection to a CPVC water supply pipe which may be used with either a washing machine outlet box or an ice maker outlet box.

According to the illustrated embodiment of the present invention a plumbing installation is provided which includes an outlet box, at least one water supply pipe extending into the box and a torque inhibiting connection between the pipe and a boiler drain valve positioned in the interior of the box. The outlet box has an outwardly opening interior and a horizontally extending bottom wall with a water supply hole extending therethrough. The water supply pipe has an upper end extending through the water supply hole in the bottom wall of the outlet box. The boiler drain valve has a male threaded lower shank in which the upper end of the water supply pipe is seated. The water supply pipe is connected to the boiler drain valve in a manner that inhibits the transmission of torque to the pipe otherwise resulting from manual rotation of the handwheel of the valve. A ferrule surrounds the upper end of the water supply pipe. A compression nut is screwed over the male threaded lower shank of the boiler drain valve to compress the ferrule around the upper end of the water supply pipe. A male threaded cylindrical adapter is connected to, and extends downwardly from, the compression nut through the water supply hole and surrounds the water supply pipe. A lock nut is screwed over the male threaded cylindrical adapter and squeezes the bottom wall between the compression nut and the lock nut. When the water supply pipe is made of CPVC this installation prevents lateral movement and/or torquing of the pipe which could weaken or fracture chemical welds between a lower end of the CPVC pipe and a CPVC fitting.

DESCRIPTION OF THE PREFERRED EMBODIMENTS

As used herein, the term "outlet box" shall be construed to cover both a washing machine outlet box and an ice maker outlet box.

Figure 1:
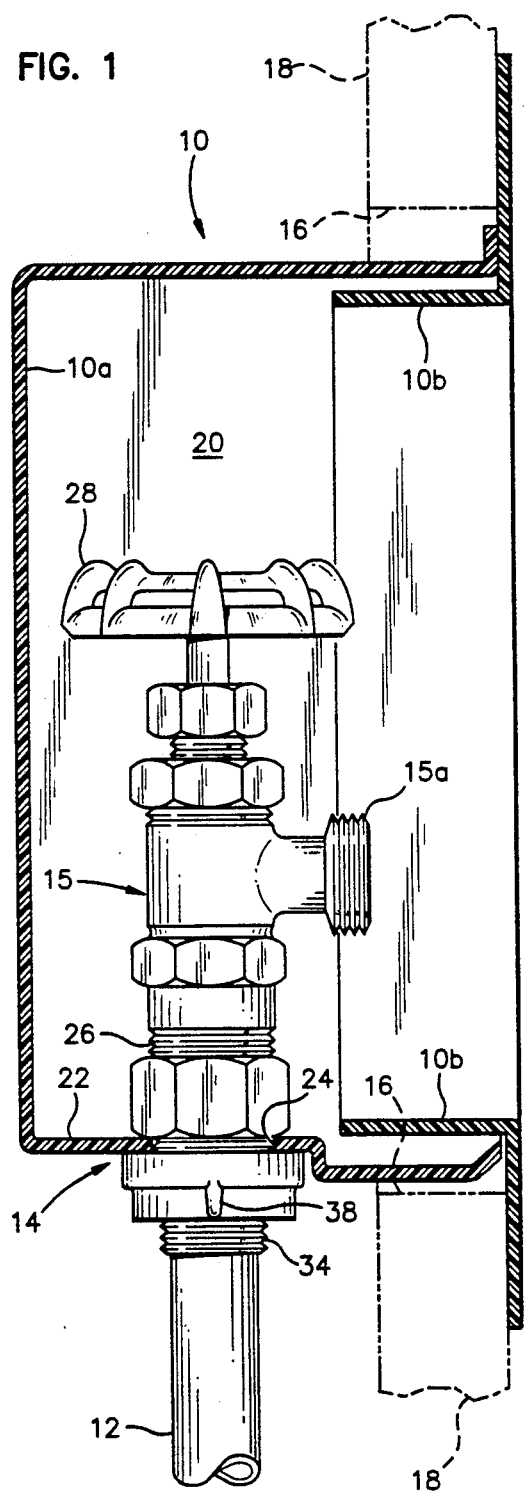
FIG. 1 is a part vertical sectional and part side elevational view of a washing machine outlet box installed in a wall and incorporating a torque inhibiting connection in accordance with a preferred embodiment of the present invention.

Referring to FIG. 1, a plumbing installation is illustrated which includes a washing machine outlet box 10, at least one CPVC water supply pipe 12 extending into the box and a torque inhibiting connection 14 between the pipe and a boiler drain valve 15 positioned in the interior of the box. It will be understood that typically both hot and cold water supply pipes extend into the washing machine outlet box, each being connected to a corresponding boiler drain valve by a torque inhibiting connection. For the sake of expediency, only one water supply pipe, boiler drain valve and torque inhibiting connection are illustrated. Also not illustrated is the DWV pipe which extends upwardly between the two water supply pipes and is connected to a drain inlet opening (not illustrated) in the washing machine outlet box. A female fitting of a water hose (not illustrated) from a washing machine may be screwed over a male fitting 15a of the boiler drain valve.

The washing machine outlet box 10 is mounted in a rectangular cut-out 16 in a drywall panel 18. The box 10 has an outwardly opening interior 20 and a horizontally extending bottom wall 22. Preferably the box 10 is made of injection molded plastic and has a two-piece construction including a box portion 10a and a surrounding peripheral rim portion 10b. The rim portion 10b forms a face plate or escutcheon that covers the gap between the box portion 10a and the edges of the rectangular cut-out 16. Normally the box portion 10a is nailed to the studs and then the drywall panel is installed. The cut-out 16 is made and then the face plate or rim portion 10b is mounted in the cut-out and coupled to the box portion 10a. It will be understood by those skilled in the art that the washing machine outlet box 10 may be one-piece, three-piece or any other conventional configuration.

Figure 2:
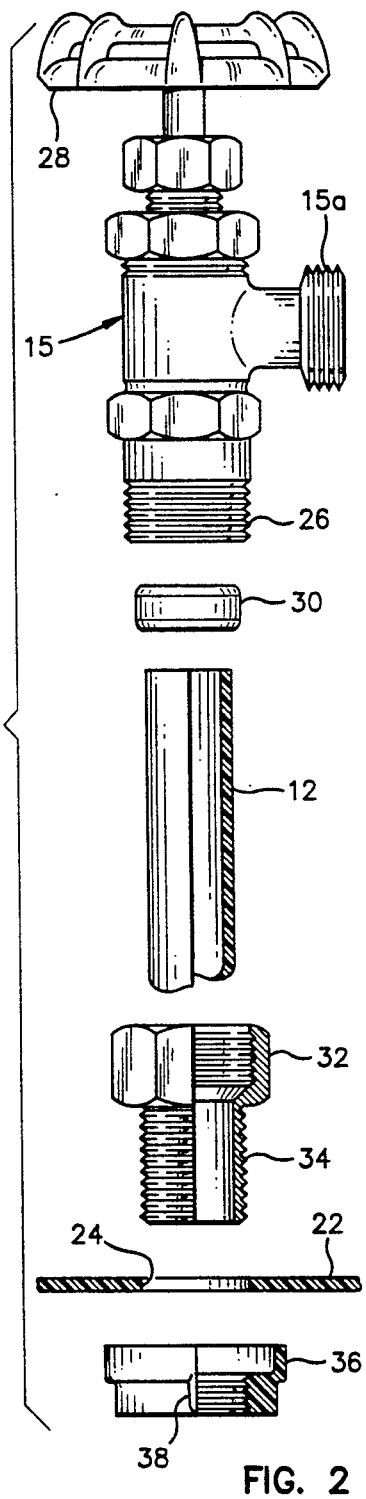
FIG. 2 is an exploded side elevational view illustrating the torque inhibiting connection of FIG. 1.

Referring to FIGS. 1 and 2, a water supply hole 24 extends through the bottom wall 22 of the washing machine outlet box 10. The CPVC water supply pipe 12 has an upper end extending through the water supply hole 24 in the bottom wall 22 of the washing machine outlet box 10. As is conventional, the diameter of the water supply hole 24 is substantially larger than the outer diameter of the water supply pipe 12.

The boiler drain valve 15 is preferably made of Brass so that it will resist corrosion. The valve 15 has a standard configuration that includes a male threaded lower shank 26 in which the upper end of the water supply pipe 12 is seated. The threads on the lower shank 26 are straight, i.e. not tapered. A handwheel 28 of the boiler drain valve 15 may be manually rotated to turn the valve ON and OFF.

The CPVC water supply pipe 12 is connected to the boiler drain valve 15 in a manner that inhibits the transmission of lateral forces and/or torque to the pipe 12 which would otherwise result from rotation of the handwheel 28. In the preferred embodiment of my invention, a Brass ferrule 30 (FIG. 2) surrounds the upper end of the CPVC water supply pipe 12. In the preferred embodiment of my invention a Brass compression nut 32 having a hexagonal outer configuration is screwed over the male threaded lower shank 26 of the boiler drain valve 15 to compress the ferrule 30 around the upper end of the CPVC water supply pipe 12. The compression nut 32 has straight threads that mate with the straight threads of the lower shank 26 of the boiler drain valve 15. The ferrule 30 and the compression nut 32 need not be made of Brass, but may be made of any other suitable metal or plastic conventionally used to make plumbing parts of this type. An outer dimension of the compression nut 32 is larger than the diameter of the water supply hole 24. In the preferred embodiment of my invention, a Brass male threaded cylindrical adapter 34 is formed integrally with, and extends co-axially downwardly from, the compression nut 32 through the water supply hole 24 and surrounds the CPVC water supply pipe 12. The diameter of the male threaded cylindrical adapter 34 is less than the diameter of the water supply hole 24. A lock nut 36 is screwed over the male threaded cylindrical adapter 34 and squeezes the bottom wall 22 between the compression nut 32 and the lock nut 36. An outer dimension of the lock nut is greater than the diameter of the water supply hole 24. The lock nut 36 is preferably made of injection molded plastic and is formed with an annular outer surface. Diametrically spaced radial projections 38 are formed on the annular outer surface for enabling the lock nut 36 to be tightened.

The installation described above prevents lateral movement and/or torquing of the CPVC water supply pipe 12 which could weaken or fracture chemical welds between a lower end of the pipe and a CPVC fitting such as a ninety degree elbow (not illustrated). The compression nut 32 and male threaded cylindrical adapter 34 need not be integrally formed but could, for example, be separate parts fit together by inserting the adapter inside the nut.

I have found that it is more economical to pre-assemble the combination of parts illustrated in FIG. 1 (except for the face plate and drywall) at the factory. The assembled unit is shipped to the plumber with a pair of four inch long CPVC stub pipes connected to the boiler drain valves. By assembling most of the parts at the factory, the boiler drain valves can be properly oriented with their fittings 15a oriented forward. The assembly of each CPVC stub pipe to each boiler drain valve can be tested at the factory for leaks.

The method of factory pre-assembly of the parts illustrated in FIG. 1 is as follows. Two stub pipes consisting of one-half inch diameter CPVC pipe four inches in length are first cut to provide the water supply pipes to the valves in the washing machine outlet box. As used herein, the term "water supply pipe" includes both CPVC risers and CPVC stub pipes. With regard to each stub, the following assembly steps take place. A ferrule 30 is slipped over the stub 12 pipe. The combined male threaded cylindrical adapter 34 and compression nut 32 are slid over the stub pipe 12. The end of the stub pipe is inserted into the lower shank 26 of the boiler drain valve 15 and the nut 32 is tightened over the male threaded shank 26 the appropriate amount to compress the ferrule 30 and provide a leak-proof coupling between the stub pipe 12 and the valve. The assembled valve and stub pipe are then tested at an appropriate UPC approved pressure to ensure that there are no leaks. The lower end of the stub pipe is then inserted through one of the water supply holes 24 in the bottom wall 22 of the washing machine outlet box 10. The valve 15 is then oriented to place its male fitting 15a forward. A lock nut 36 is then tightened over the male threaded cylindrical adapter 34 to squeeze the bottom wall 22 between the compression nut and the lock nut 36. The other stub pipe and boiler drain valve are similarly connected and rigidly mounted to the washing machine outlet box.

From the above description it will be understood that the parts illustrated in FIG. 1 could be pre-assembled in the field the same as the factory installation described above. The pre-assembled unit can then be installed as follows. The plumber nails the outlet box to the studs, and then couples the lower ends of the stub pipes to a pair of CPVC risers with suitable CPVC fittings and adhesive. The drywall panel 18 is then installed, the cut-out 16 is made, and the face plate 10b is installed.

It is also possible to connect a pair of installed CPVC risers through the bottom wall of the outlet box directly to the boiler drain valves, without using intermediate CPVC stub pipes. This method generally must be done before the drywall goes up because it is necessary to orient the drain valves before tightening the lock nuts. This method will be described only with respect to one of the boiler drain valves, it being understood that each is connected in the same manner. The first step of this in-place method is to slide the lock nut 36 over the upper end of the CPVC water supply pipe 12. This pipe is already secured to the studs and may also be referred to as a riser. Next, the outlet box is lowered so that the upper end of CPVC water supply pipe 12 extends through the water supply hole 24 in the bottom wall 22 of the washing machine outlet box 10. The diameter of the water supply hole 24 in the bottom wall 22 is less than the outer dimension of the lock nut 36 so that the lock nut 36 can later be tightened against the bottom wall 22.

The next step of the in-place assembly method is to slide the co-axially joined compression nut 32 and male threaded cylindrical adapter 34 over the upper end of the CPVC water supply pipe 12. The male threaded cylindrical adapter 34 is then slid downwardly through the water supply hole 24 in the bottom wall 22 of the box 10. This is possible because the outer diameter of the male threaded cylindrical adapter 34 is less than the diameter of the water supply hole 24. The outer dimension of the compression nut 32 is greater than the diameter of the water supply hole 12 so that the compression nut engages and is stopped by the bottom wall 22. Next the ferrule 30 is slid over the upper end of the CPVC water supply pipe 12.

According to the in-place assembly method, the upper end of the CPVC water supply pipe 12 is then inserted into the male threaded lower shank 26 of the boiler drain valve 15. The compression nut 32 is screwed over the male threaded lower shank 26 of the boiler drain valve 15 to compress the ferrule 30 against the upper end of the CPVC water supply pipe 12. This provides a leak-proof connection between the boiler drain valve 15 and the CPVC water supply pipe 12. The drain valve 15 must be held in proper orientation with its male fitting 15a pointed forward while the compression nut 32 is tightened. The lock nut 36 is then manually screwed over the male threaded cylindrical adapter 34 and tightened to squeeze the bottom wall 22 of the washing machine outlet box 10 between the compression nut 32 and the lock nut 36. The tightening of the lock nut 36 against the bottom wall 22 of the washing machine outlet box 10 substantially inhibits the transmission of lateral forces and/or torque to the water supply pipe 12 which would otherwise result from manual rotation of the handwheel 28 of the boiler drain valve 15.

My invention may also be utilized to rigidly connect a water supply valve to the bottom wall of an ice maker outlet box (not illustrated) to thereby inhibit the transmission of lateral forces and/or torque to a one-half inch CPVC water supply pipe when the handwheel of the valve is turned. As stated above, it is conventional to utilize a molded plastic outlet box to mount a water supply valve in a recessed manner in a kitchen wall for connecting a water supply line to an ice maker of a refrigerator. The ice maker outlet box is smaller than the washing machine outlet box. The ice maker box encloses only one valve and has no drain. The valve is similar to a boiler drain valve except that instead of male fitting 15a (FIG. 1) the valve has a compression type fitting for connecting one-quarter inch Copper or plastic tubing from the ice maker. Presently one-half inch CPVC pipe extends loosely through a hole in the bottom wall of the ice maker outlet box. The CPVC water supply pipe is connected to the male threaded lower shank with a ferrule and compression nut, but the valve is not anchored to the bottom wall of the ice maker outlet box. My invention can be advantageously adapted to the ice maker outlet box. The upper end of the CPVC water supply pipe is connected to the threaded lower shank of the valve utilizing a ferrule and a combination compression nut and male threaded cylindrical adapter like parts 32 and 34 shown in FIG. 1. Similarly a lock nut similar to part 36 is screwed over the lower end of the male threaded cylindrical adapter to rigidly mount the valve to the bottom wall of the ice maker outlet box.

While I have described two different embodiments of my invention, and both pre-assembly and in-place assembly methods of installation, it should be understood that further modifications and adaptations of my invention will occur to persons skilled in the art. Therefore, the protection afforded my invention should only be limited in accordance with the scope of the following claims.

I claim:

1. A plumbing installation, comprising:
   an outlet box having an outwardly opening interior and a horizontally extending bottom wall with a water supply hole extending therethrough;
   a water supply pipe made of CPVC having an upper end extending through the water supply hole in the bottom of the outlet box;
   a boiler drain valve positioned in the interior of the outlet box and having a male straight threaded lower shank in which the upper end of the water supply pipe is seated and a handwheel which may be manually rotated to turn the valve ON and OFF; and
   means for connecting the water supply pipe to the boiler drain valve to thereby inhibit the transmission of torque to the water supply pipe resulting from rotation of the handwheel including a ferrule surrounding the upper end of the water supply pipe, a compression nut having straight female threads screwed over the male threaded lower shank of the boiler drain valve to compress the ferrule around the upper end of the water supply pipe, a male threaded cylindrical adapter connected to, and extending downwardly from, the compression nut through the water supply hole and surrounding the water supply pipe, and a lock nut screwed over the male threaded cylindrical adapter to squeeze the bottom wall between the compression nut and the lock nut.

2. A plumbing installation according to claim 1 wherein the boiler drain valve and the compression nut are made of Brass.

3. A plumbing installation according to claim 1 wherein the outlet box is made of injection molded plastic.

4. A plumbing installation according to claim 1 wherein the lock nut is made of injection molded plastic.

5. A plumbing installation according to claim 1 wherein the ferrule is made of Brass.

6. A plumbing installation according to claim 1 wherein the lock nut is made of injection molded plastic and is formed with an annular outer surface with diametrically spaced radial projections for enabling the lock nut to be tightened with a person's fingers.

7. A plumbing installation according to claim 1 wherein the outlet box has a two-piece construction including a box portion and a surrounding peripheral rim portion.

8. A plumbing installation according to claim 1 wherein the male threaded cylindrical adapter is formed integrally with the compression nut.

9. A plumbing installation, comprising:
   a drywall panel having a rectangular cut-out;
   an outlet box mounted in the cut-out of the drywall panel, the outlet box having an outwardly opening interior and a horizontally extending bottom wall with a water supply hole extending therethrough;
   a vertically extending CPVC water supply pipe having an upper end extending through the water supply hole in the bottom wall of the outlet box;
   a boiler drain valve positioned in the interior of the outlet box and having a male threaded lower shank in which the upper end of the water supply pipe is seated and a handwheel which may be manually rotated to turn the valve ON and OFF; and
   means for connecting the water supply pipe to the boiler drain valve to thereby inhibit the transmission of torque to the water supply pipe resulting from rotation of the handwheel including a ferrule surrounding the upper end of the water supply pipe, a compression nut screwed over the male threaded lower shank of the boiler drain valve to compress the ferrule around the upper end of the water supply pipe, a male threaded cylindrical adapter connected to, and extending downwardly from, the compression nut through the water supply hole and surrounding the water supply pipe, and a plastic lock nut screwed over the male threaded cylindrical adapter to squeeze the bottom wall between the compression nut and the lock nut.

10. A pre-assembled combination outlet box, drain valve and stub pipe, comprising:
   an outlet box having an outwardly opening interior and a bottom wall with a water supply hole extending therethrough;
   a CPVC stub pipe having an upper end extending through the water supply hole in the bottom wall of the outlet box;
   a valve positioned in the interior of the outlet box and having a male threaded lower shank in which the upper end of the CPVC stub pipe is seated and a handwheel which may be manually rotated to turn the valve ON and OFF; and
   means for connecting the stub pipe to the boiler drain valve to thereby inhibit the transmission of torque to a water supply pipe to which the stub pipe can be adhesively connected, the torque resulting from rotation of the handwheel, including a ferrule surrounding the upper end of the stub pipe, a compression nut screwed over the male threaded lower shank of the boiler drain valve to compress the ferrule around the upper end of the stub pipe, a male threaded cylindrical adapter connected to, and extending downwardly from, the compression nut through the water supply hole and surrounding the stub pipe, and a lock nut screwed over the male threaded cylindrical adapter to squeeze the bottom wall between the compression nut and the lock nut.

11. A method of connecting a CPVC water supply pipe to a boiler drain valve positioned inside an outlet box, comprising the steps of:

sliding a lock nut over an upper end of the CPVC water supply pipe;

inserting the upper end of the CPVC water supply pipe through a water supply hole in a bottom wall of the outlet box, a diameter of the water supply hole in the bottom wall being less than an outer dimension of the lock nut so that the lock nut cannot pass through the water supply hole;

sliding a co-axially joined compression nut and male threaded cylindrical adapter over the upper end of the CPVC water supply pipe, an outer diameter of the male threaded cylindrical adapter being less than the diameter of the water supply hole in the bottom wall and an outer dimension of the compression nut being greater than the diameter of the water supply hole so that the compression nut cannot slide through the water supply hole;

sliding the cylindrical adapter through the water supply hole in the bottom wall of the outlet box;

sliding a ferrule over the upper end of the CPVC water supply pipe;

inserting the upper end of the CPVC water supply pipe into a male threaded lower shank of the boiler drain valve;

screwing the compression nut over the male threaded lower shank of the boiler drain valve to compress the ferrule against the upper end of the CPVC water supply pipe to thereby provide a leak-proof connection between the boiler drain valve and the CPVC water supply pipe; and screwing the lock nut over the male threaded cylindrical adapter and tightening the lock nut to squeeze the bottom wall of the outlet box between the compression nut and the lock nut;

whereby the tightening of the lock nut against the bottom wall of the outlet box will substantially inhibit the transmission of torque to the water supply pipe otherwise resulting from manual rotation of a handwheel of the boiler drain valve.

* * * * *